(12) United States Patent
Huo

(10) Patent No.: US 9,546,010 B2
(45) Date of Patent: Jan. 17, 2017

(54) EXHAUST VALVE

(75) Inventor: Jiyan Huo, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 682 days.

(21) Appl. No.: 13/978,700

(22) PCT Filed: Oct. 27, 2011

(86) PCT No.: PCT/CN2011/081406
§ 371 (c)(1),
(2), (4) Date: Jul. 8, 2013

(87) PCT Pub. No.: WO2013/060006
PCT Pub. Date: May 2, 2013

(65) Prior Publication Data
US 2013/0276408 A1    Oct. 24, 2013

(51) Int. Cl.
| B65B 17/00 | (2006.01) |
| B65B 63/08 | (2006.01) |
| B65B 31/00 | (2006.01) |
| B65B 7/28 | (2006.01) |
| F16K 31/00 | (2006.01) |

(52) U.S. Cl.
CPC .............. *B65B 17/00* (2013.01); *B65B 7/2842* (2013.01); *B65B 31/00* (2013.01); *B65B 63/08* (2013.01); *F16K 31/002* (2013.01)

(58) Field of Classification Search
None
See application file for complete search history.

(56) References Cited

U.S. PATENT DOCUMENTS

| 5,240,027 A * | 8/1993 | Vertanen ............... F16K 17/003 137/73 |
| 5,665,408 A * | 9/1997 | Coupe .................. B65D 77/225 206/550 |
| 5,960,812 A | 10/1999 | Johnson |

FOREIGN PATENT DOCUMENTS

| CN | 2099230 U * | 3/1992 |
| CN | 2099230 U | 3/1992 |
| CN | 201764050 U | 3/2011 |
| JP | 11173446 A | 6/1999 |
| JP | 2007119334 | 5/2007 |
| WO | WO 02/056400 A2 | 7/2002 |

OTHER PUBLICATIONS

Bewlay, et al., Conductivity Improvements to Spray-Produced LiFePO4 by Addition of a Carbon Source, Materials Letters 58 (2004) pp. 1788-1791.
International Search Report dated Aug. 23, 2012 received in International Application No. PCT/CN2011/081406.
Lin, et al., High Temperature Oxidation of a Sn—Zn—Al Solder, Oxidation of Metals, vol. 50, No. 314, 1998 pp. 255-267.
Xie, et al., Physical and Electrochemical Properties of Mix-Doped Lithium Iron Phosphate as Cathode Material for Lithium Ion Battery, Electrochimica Acta, No. 51, 2006, pp. 2063-2067.

* cited by examiner

*Primary Examiner* — Gloria R Weeks
*Assistant Examiner* — Tanzim Imam
(74) *Attorney, Agent, or Firm* — Maschoff Brennan

(57) ABSTRACT

Various embodiments of exhaust valves are described. In an example, an exhaust valve assembly includes a valve body having a cylinder, a piston disposed within the cylinder, and a sealing material disposed within a trough at the bottom of the cylinder. The selection of the sealing material may be based on an operational temperature that is above a melting point of the sealing material.

14 Claims, 6 Drawing Sheets

EXHAUST VALVE

CROSS-REFERENCE TO RELATED APPLICATION

This application is the U.S. national phase entry under 35 U.S.C. §371 of PCT/CN2011/081406, filed Oct. 27, 2011, the entire disclosure of which is hereby incorporated by referenced herein

TECHNICAL FIELD

Certain embodiments discussed herein relate generally to an exhaust valve and, more particularly, to an exhaust valve having a liquid or transitional state sealing arrangement.

BACKGROUND

Various modern processes require the use of one-way valves. For example, in the processing and refining of various raw materials, the desired compounds or materials may be extracted, or undesired contaminants may be removed. One method of processing is by heating the material, causing a release of contaminants. Similarly, manufacturing processes such as sintering, may require the use of one-way valves to allow gas to escape during the heating process, which may also remove contaminants from the holding vessel and the starting materials.

For example, in manufacturing the cathode material of power batteries, the oxygen content in the atmosphere during the process of sintering lithium iron phosphate is preferably less than about 10 ppm. In conventional processes, the powder to be sintered into lithium iron phosphate is generally contained in an open-type container made of refractory material and the sintering device is preferably within an oxygen-free environment. This oxygen-free environment may cause various problems, such as instable quality and high operation cost. Alternatively, if the raw material is placed in an air-tight container for sintering, the presence of gases and other volatiles created during the pre-sintering process may contaminate the lithium iron phosphate. Information concerning the processing and properties of lithium iron phosphate may be found for example in Bewlay, S. L. et al., *Conductivity improvements to spray produced $LiFePO_4$ by addition of a carbon source*, Materials Letters 58 (2004) 1788-1791, and Xie, Hui and Zhentao Zhou, *Physical and electrochemical properties of mix-doped lithium iron phosphate as cathode material for lithium ion battery*, Electrochimica Acta 51 (2006) 2063-2067.

At present, the research, development and production activities relating to lithium iron phosphate, as the cathode material for power batteries, are carried out on a large scale throughout the world. There is a consistent pursuit in the industry to reduce cost and ensure product quality. The sintering of lithium iron phosphate is one stage in the production process. The application of an air tight container in a common sintering furnace to sinter lithium iron phosphate is a recent development, whereby pure lithium iron phosphate emerges from the pre-sintering process without the emission of undesirable gases. The successful implementation of the technical process depends in part on the functional reliability of a one-way exhaust valve to maintain the purity of the lithium iron phosphate during the pre-sintering process.

Traditional one-way valves, or sealing valves typically rely on high geometric precision to ensure that the adjoining surfaces of the seal (or valve) closely coincide with each other, even under demanding conditions. For example, when a traditional one-way valve is configured to permit a flow of gas through the valve, the adjoining surfaces (or sealing faces) begin to wear once foreign material (e.g., dirt, pastes, viscous materials, etching/corrosive/acidic chemicals) passes through the valve along with the gas. In time, the continual wear will cause the seal to fail, rendering the one-way valve less effective. Further, traditional one-way valves use seals that may not survive harsh processing conditions, such as a high temperature environment.

Moreover, in applications with a strict sealing requirement, such as the processing of lithium iron phosphate (<10 ppm oxygen content), it may be very impractical and costly to use traditional one-way valves. First, due to the strict sealing requirement, the cost of the one-way valves may be high since the manufacturing of such a high precision and high performance valve is expensive. Second, as discussed above, foreign materials may still damage the valve and cause the valve to fail, which may require that a new valve be used for each pre-sintering run. Third, despite the strict sealing requirement, the one-way valve must still be responsive and flexible enough to allow proper gas flow, even when foreign materials become lodged or stuck within the sealing surfaces, obstructing the proper flow of gas, and also preventing a proper seal when the gas flow stops.

SUMMARY

In one embodiment, an air-tight container is equipped with a one-way exhaust valve. During the pre-sintering process of lithium iron phosphate, the valve is first maintained in a state of static seal when no exhausted materials or gas are generated. Once exhausted material is generated, the valve allows for one-way exhaust by means of dynamic seal. Finally, the valve achieves an effective static seal near the completion of the pre-sintering process when no materials or gases are further exhausted. The exhaust valve may be sealed by use of solid-liquid converting metal in high-temperature environment.

While various embodiments discussed herein utilize the pre-sintering and sintering processes of lithium iron phosphate as background, it will be appreciated that the embodiments discussed herein can be used for a variety of processes and products, including processes or products where a traditional, one-way valve was used. Generally, the embodiments discussed herein are applicable to processes or products that require both the possibility of exhausting material or gas in one instance, and then providing an air-tight seal in a second instance.

In another embodiment, the seal is selected to remain in liquid form for all temperatures throughout the process, from room temperature to the maximum process temperature. These liquids may be of any suitable composition, such as water or oils that would not contaminate the material within the air-tight container (e.g., lithium iron phosphate). During the pre-sintering process of lithium iron phosphate, the valve allows for one-way exhaust due to the pressures exerted by the gas upon the plunger and spring system within the exhaust valve body. At the end of the process, the gas pressures recede and no longer overcome the weight and/or the spring force of the plunger and spring system, causing the plunger to submerge into the liquid seal, sealing the contents of one side of the exhaust valve, from the other side, e.g., the atmosphere.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

Various non-limiting embodiments are described with reference to the accompanying drawings, in which like reference characters reference like elements, and wherein:

FIG. 2 shows the valve piston resting in a sealed position within the valve cylinder before heat is applied to the container, where a first (piston) sealing material is in a solid state. FIG. 3 shows the valve assembly after heat has been applied to the container, where the valve assembly is in a venting position, where the valve piston is suspended by exhaust gas pressure in an intermediate position within the valve cylinder. FIG. 4 shows the valve assembly at a later stage during the pre-sintering process, where the valve piston is still suspended by exhaust gas pressure in an intermediate position within the valve cylinder, but where the temperature of the valve assembly has increased sufficiently to cause the piston sealing material to transition from a solid to a liquid state. FIG. 5 shows the valve assembly at an end stage of the pre-sintering process, where exhaust gases have ceased venting, and the valve piston has settled back into its original resting position and the piston sealing material has at least partially transitioned back from a liquid to a solid state.

DETAILED DESCRIPTION

Figure 1:
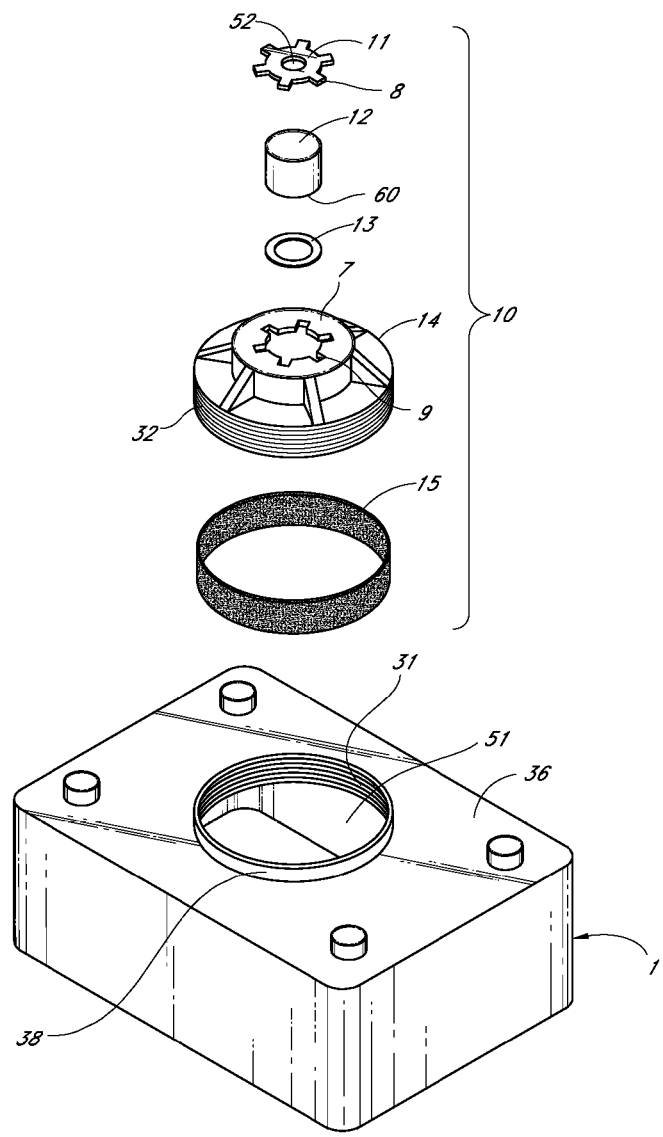
FIG. 1 is an exploded view of an embodiment of an exhaust valve assembly and container.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Exhaust Valve Assembly

FIG. 1 is an exploded view of an embodiment of an exhaust valve assembly configured to permit exhausting of gases from a container, e.g., for use in a pre-sintering process. An air-tight container 1 may be of any size, shape or construction, suitable for its intended use. In some embodiments, the container 1 is adapted to heating its contents, such as for example, to vaporize contaminants. The container 1 has one or more openings, configured to sealably accommodate one or more exhaust valve assemblies 10. In one embodiment, the exhaust valve assembly 10 includes screw threads 32 configured to securely mate with screw threads 31 provided on the container 1. These screw threads provide a reversible secure fit and provide some level of air-tightness. Other suitable known methods of securing can be used, such as, by way of example, a press-fit assembly, or a welded assembly. However, use of a screw-type assembly may be desirable for some applications, e.g., the pre-sintering of lithium iron phosphate, because the screw-type coupling allows the raw material to be conveniently placed into and taken out of the air-tight container 1. More particularly with reference to the illustrated container 1 in FIG. 1, a single opening 51 on a top surface 36 of the container 1 is defined by an annular lip or flange 38, having a threaded inner surface 31. In the illustrated embodiment, an exhaust valve body 14 has a threaded outer surface 32, which is configured to screw into the threaded inner surface 31 of the annular lip 38. In the illustrated embodiment, a thread sealing material 15 may be disposed between the threaded surfaces 31 and 32 to provide an airtight seal between the container 1 and the exhaust valve body 14.

The exhaust valve body 14 may further define a cylinder (not shown in FIG. 1; 50 in FIGS. 2-6) within which a valve piston 12 may be slideably engaged. A piston sealing material 13 may be disposed between a base region 60 of the valve piston 12 and an annular trough (not shown in FIG. 1; 22 in FIGS. 2-6) in the cylinder of the exhaust valve body 14. The exhaust valve assembly 10 may also include a retention plate 11 configured to retain the piston 12 within the cylinder of the valve body 14. The retention plate may have one or more venting holes 52 to allow exhaust gases to pass out of the exhaust valve assembly 10.

In some embodiments (not illustrated), a spring may be disposed between the retention plate 11 and the piston 12. Spring tension would counteract the upward force exerted by exhaust gases on the piston. This would allow considerable design flexibility, by permitting manufacturers and/or users to vary venting pressure to meet demands of different exhaust valve applications. An embodiment of an exhaust valve assembly that includes a spring is illustrated and described with reference to FIG. 7.

FIGS. 2-5 are detailed cross-sectional views of an embodiment of the exhaust valve assembly 10 and container 1 shown at different stages of a pre-sintering process. In these views, only the top surface 36 of the container 1 configured to couple with the exhaust valve body 14 is shown. Although these embodiments are shown and described in the context of a process for pre-sintering lithium iron phosphate, it is understood that these embodiments may be useful for any process in which a one-way exhaust valve may provide advantages. In a pre-sintering process, the raw materials are placed into the container 1 prior to securing the exhaust valve assembly 10 to the opening 51 in the container 1.

Figure 2:
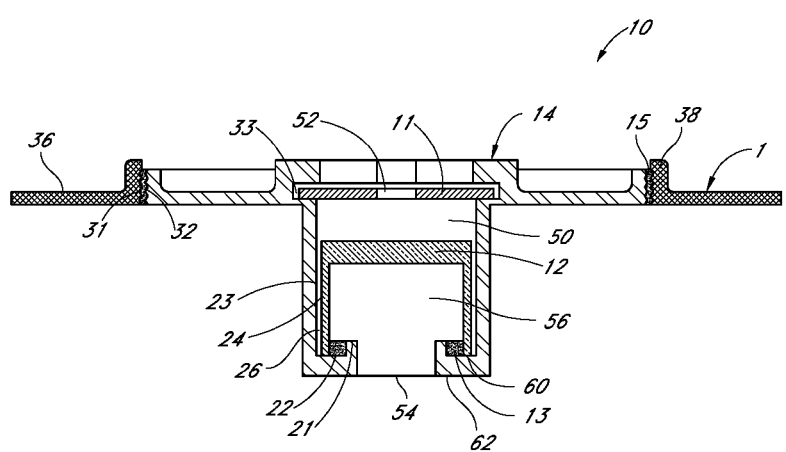
FIGS. 2-5 are detailed cross-sectional views of an embodiment of the exhaust valve assembly and container at various stages of a pre-sintering process.

With reference to FIG. 2, the valve body 14 is shown coupled to the annular lip 38 protruding from the top surface 36 of the container 1. Of course in other embodiments, the annular lip 38 may extend downward into the container (rather than protruding upward), and/or assume any other geometric arrangement, as long as there is some structure on the container 1 that is adapted to receive and couple, reversibly or irreversibly, with a structure on the valve body 14. In the illustrated embodiment, the threaded outer surface 32 of the valve body 14 is shown screwed into the inner surface 31 of the annular lip 38 of the container 1, and a thread sealing material 15 is disposed between the threaded surfaces 31 and 32, thereby providing a seal that is at least substantially gas-tight between the valve body and the container. The valve body 14 further defines a cylinder 50 within which a piston 12 is slideably engaged. A gap 26 formed between an inner wall 23 of the cylinder 50 and an outer wall 24 of the piston 12 is sufficient to allow sliding of the piston 12 within the cylinder 50.

The cylinder 50 formed within the valve body 14 has at least one opening 54 which may be disposed as shown on a bottom portion 62 of the valve body 14. The opening 54 allows direct exchange of exhaust gases, volatiles, and/or suspended particulate materials generated by heating, e.g., lithium iron phosphate in the container, between the interior (not shown) of the container 1 and an interior space 56 defined by the illustrated cylindrical (hollow) piston 12. Of course, in embodiments where the piston may be solid, the opening 54 in the valve body 14 would allow the exhaust gases, volatiles and/or suspended particulate materials to exert pressure on a bottom surface of such a solid piston (not illustrated). The cylinder 50 formed within the valve body 14 also has at least one opening 52 which may be disposed, as shown, along a top portion of the cylinder 50, defined by the retention plate 11. The opening(s) 52 may allow venting of exhaust gases into the outside environment, when the valve is in an open configuration (See e.g., FIG. 3).

With continued reference to FIG. 2, the valve body 14 is further configured to provide a seat or trough 22 on which the base region 60 of the piston 12 may rest when the valve is in a closed configuration (as illustrated in FIG. 2). Where the piston 12 is cylindrical (as shown), the seat or trough 22 is defined by the inner wall 23 of the valve body, the bottom portion 62 of the valve body, and an annular lip 21 extending upward from the bottom portion 62. In the illustrated embodiment, a piston sealing material 13 is shown between the annular lip 21 and the base region 60 of the piston 12.

While the valve body 14 and the cylinder 50 may be of any geometric configuration that could accommodate a piston or piston, such as the piston 12, a cylindrical design may be desired in some embodiments due to its simplicity. Thus, the inner wall 23 of the cylinder 50 may form a cylindrical surface, and the outer wall 24 of the piston 12 may also form a cylindrical surface. The cylindrical surfaces 23 and 24 allow for interaction between the valve piston 12 and the valve cylinder 50 much like a piston within the cylinder of a car engine. That is, the complementary shapes, sizes and configurations of the surfaces 23 and 24 allow the piston 12 to travel up and down within the cylinder 50, while generally maintaining proper orientation. The gap 26 between the cylindrical surfaces 23 and 24, may be sized to facilitate movement of the piston 12 within the cylinder 50, and also, to accommodate gases—thereby allowing exhaust gases to escape the valve body via the exhaust opening(s) 52. The size of the gap 26 may be adjusted by varying either the inner diameter of the cylinder 50, the outer diameter of the piston 12, or both, depending on the particular demands of the intended heating procedure, and the volume of gases and particles which may be passing through the gap 26.

In addition to the cylindrical embodiment described above, other shapes may be used for the piston 12 and cylinder 50, for example, a conical shape. A piston with a conical shape may have outer walls generally parallel to the conical shape of the cylinder it fits within. As the piston moves upwards, the gap between the cylinder walls and the piston walls may increase due to the conical shape. Also, when the piston is at rest, it may effectively close off any gap between its walls and the cylinder walls. In various other embodiments, the piston 12 and the cylinder 50 may also take the form of other shapes and polygons, including but not limited to an oval, square, rectangle, triangle, pentagon, or hexagon.

The retention plate 11 may be secured above the piston 12 to constrain it within the cylinder 50 of the valve body 14. The retention plate 11 may be secured by fitting into a slot 33 in the valve body 14. The retention plate fastening mechanism may be of screw threads, or press fit, a tongue and groove lock (as illustrated in FIG. 1), or any known retention fitting that locks or otherwise holds the retention plate 11 in place, such that removal of the retention plate 11 may require some type of manipulation (e.g., twisting, turning, latching, locking). Use of a removable retention plate 11, as opposed to a permanent (e.g., welded) or integral valve body top portion, allows the piston 12 to be removed after the assembly has been used for a heating procedure (e.g., pre-sintering process), for cleaning of the piston 12 and the cylinder 50 or replacement of the piston 12 or the piston sealing material 13. The opening 52 (or series of openings) in the retention plate 11 allow gases to escape the valve body 14.

In one embodiment, the valve body 14 and the retention plate 11 may both be made of the same high temperature resistant metal material. In one embodiment, the piston 12 may be made of high temperature resistant ceramic material. Other materials known in the art can be used for the valve body 14, the retention plate 11 and the piston 12, and each of them may independently include any combination of metal, fiberglass, ceramic or other materials. Generally, the surfaces of the piston 12 and the walls enclosing the cylinder 50 may be manufactured to a high degree of geometric precision. This precision may allow for surface interaction between the inner walls 23 of the cylinder 50 and the outer walls 24 of the piston 12, sealing as a result of precise mating surfaces, and ability to control the amount of gas and the distribution of the gas within the gap 26 between the piston 12 and the cylinder 50. In another embodiment, the inner walls 23 of the cylinder 50 may be lined with a ceramic material or metal if necessary to achieve the desired surface characteristics and precision.

The first or piston sealing material 13 may be placed at the bottom of the trough 22. The sealing material can take different physical forms. For example, it may be: a powder, such as a metallic powder; liquid, such as oil, water, alcohol or other liquids; or it may be a solid material, formed into a ring, or a shaped wire band, that is positioned adjacent to the annular lip 21. The sealing material may be of any metal, ceramic, or hybrid compound. For example, solder-type materials can be used, such as: 91Sn-9(95Zn—Al); 91Sn-9Zn; 63Sn-37Pb; 99.4Sn-0.6Al; or Sn. Applicants hereby incorporate by reference herein the following reference, which provides additional background information concerning several solder-type materials; Lin, Kwang-Lung and Tzy-Ping Liu, *High-Temperature Oxidation of a SN—ZN—AL Solder*, Oxidation of Metals, Vol. 50, Nos. 3/4 (1998), 255-267. Further, solder-type materials can be combined with ceramic materials or other materials, where the selection of the piston sealing material 13 may be based on one or more operation temperatures of the process.

Similarly, the thread sealing material 15 may be placed on either the threaded outer surface 32 of the valve body 14 or the threaded inner surface 31 of the annular lip 38 of the container 1—or on both surfaces. If there are no threads on the outer surface 32 of the valve body 14 or the inner surface 31 of the annular lip 38 of the container 1, the thread sealing material 15 may be placed between the two interfacing surfaces. The thread sealing material 15 may be formed into ring, or a shaped wire band, that is positioned between the two interfacing surfaces, and may be compressed as the exhaust valve assembly 10 is tightly fitted onto the air-tight container 1. This thread sealing material 15 may be the same or different from the piston sealing material 13. The thread sealing material 15 may be a powdery material, such as a mixed-metallic powder; or it may be a solid material. The thread sealing material may be of any metal, ceramic, or hybrid compound, such as solder-type materials like: 91Sn-9(95Zn—Al); 91Sn-9Zn; 63Sn-37Pb; 99.4Sn-0.6Al; or Sn, which may also be combined with ceramic materials or other materials. The selection of the thread sealing material 15 may be based on one or more operational temperatures of the process. The piston sealing material 13 and the thread sealing material 15 may be independently selected based on the process temperature, and shaped, applied or installed during assembly to form an initial static seal, such that the interior space of the container is sealed in a substantially gas-tight manner from the outside environment. For example, the piston sealing material 13 may be shaped and installed so as to compress outwardly against the piston 12, securing the piston 12 in place on the seat or trough 22 along the bottom portion 62 of the valve body 14, thereby effectively preventing any gases from flowing in any direction, either into or out of the container 1 via the upper 52 and/or lower 54 openings in the valve body 14, whereas the thread sealing material 15 may be shaped and installed so as to compress between the threaded surfaces 31 and 32, thereby effectively preventing any gases from flowing into or out of the container 1 via any potential gaps between the threaded surfaces 31 and 32.

Figure 3:
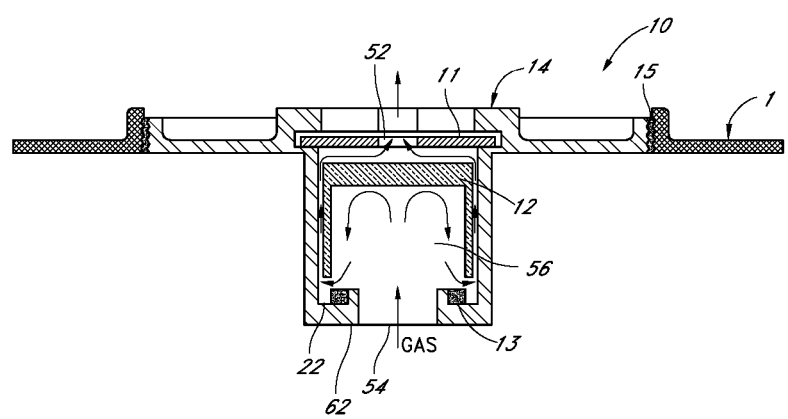

With reference to FIG. 3, the exhaust valve assembly 10 is shown after the pre-sintering process has been initiated. As the container 1 and raw materials therein are heated, exhaust gases are generated. These gases may include for example, volatile materials, contaminants or impurities from the raw materials, such as particulates, viscous materials and other waste products. The exhaust gases travel through the opening 54 defined by the bottom portion 62 of the valve body 14, and into the interior space 56 of the piston 12. As the exhaust gas pressure increases, the valve piston 12 separates from the piston sealing material 13 and is forced upward in the cylinder 50 by exhaust gas pressure. The piston 12 may levitate and/or tend to move up and down within the cylinder, depending on the dynamic equilibrium between the upward force exerted by the exhaust gas pressure and the opposing downward force exerted by gravity (weight of the piston 12). This dynamic equilibrium between the exhaust gas pressure and the weight of the piston may cause the piston to flutter up and down within the cylinder. As a result of the piston 12 separating from the piston sealing material 13 and rising in the cylinder, gases are now provided with a passageway to vent to the outside—as illustrated by the arrows, through the gap 26 between the inner walls 23 of the valve body 14 and the outer walls 24 of the piston 12, and up through the opening(s) 52 in the retention plate 11 positioned at the top of the cylinder 50.

Figure 4:
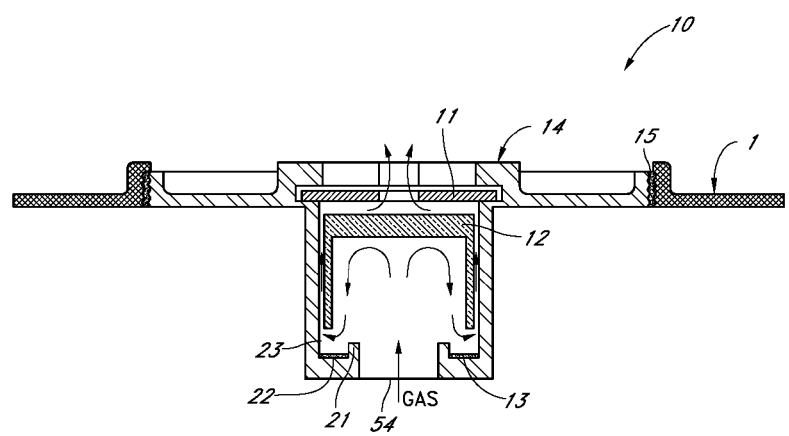

In FIG. 4, some amount of gases has already escaped from the valve body 14 through the opening(s) 52 in the retention plate 11 at the top of the cylinder 50, and the process has reaching its operational temperature. The piston sealing material 13 has melted—it has changed from a solid or powdery form and turned into a liquid or semi-liquid (viscous) form. The piston sealing material 13 pools within the trough area 22 defined by the inner wall 23 of the valve body, the bottom portion 62 of the valve body, and an annular lip 21 extending upward from the bottom portion 62. In some embodiments, the thread sealing material 15 may also melt and turn into a liquid or semi-liquid (viscous) form, while in other embodiments, the thread sealing material may be selected so as to remain solid within in the interface between the threaded surfaces 31 and 32. In some embodiments, the thread sealing material may be selected to become a semi-liquid at operating temperature, thereby creating a better seal during operation. In other embodiments, the thread sealing material 15 may melt at the same point in the process as the piston sealing material 13. In some embodiments, the two sealing materials may melt at different points of the process. In some embodiments, the thread sealing material may not melt at all. In some embodiments, the process operator may have flexibility to choose among different sealing materials in order to customize the seal for the particular operation.

Figure 5:
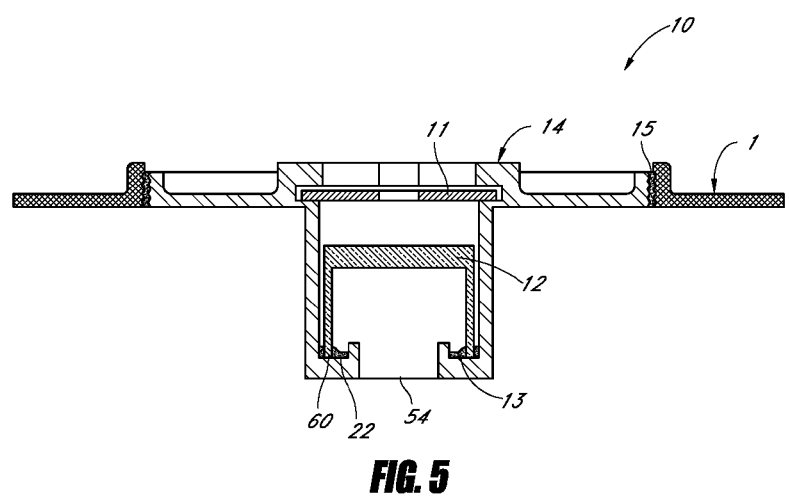

In FIG. 5, at some point in the process, perhaps near completion, the weight of the piston 12 exceeds the forces created by the pressure of the escaping gases and contaminates. The piston 12 then comes to rest at the bottom of the trough area 22 defined by the inner wall 23 of the valve body, the bottom portion 62 of the valve body, and an annular lip 21 extending upward from the bottom portion. As illustrated, the base region 60 of the valve piston 12 may become submerged, surrounded or engulfed within the liquid or semi-liquid (viscous) piston sealing material 13 pooled within the trough 22, thereby creating a dynamic seal.

As the process temperature decreases, such as when the pre-sintering furnace temperature decreases, or when the container 1 is removed from the pre-sintering furnace, the piston sealing material 13 may begin to solidify, encasing the base region 60 of the valve piston 12 within it. In some embodiments, solidification of the piston sealing material 13 may result in an air-tight seal. In other embodiments, the seal may be partially or nearly air-tight. The piston 12 may be sealed within the trough area 22, with the piston sealing material 13 mimicking a welding material. The resulting bond may be similar to a braze weld.

After the pre-sintering process has been completed, the material undergoing the pre-sintering process, e.g., the lithium iron phosphate, may be removed from the container 1. The exhaust valve assembly 10 may be disassembled and subsequently cleaned for future use. The retention plate 11 may be unlocked, and the piston 12 may be removed from the cylinder 50. In some embodiments, the piston sealing material 13 and thread sealing material 15 may be removed and replaced with new sealing materials. In embodiments where the piston 12 and the walls of the cylinder 50 are made of or lined with ceramic materials, the disassembly and cleaning process may be easier as the welding effect of the piston sealing material 13 may not be as strong compared to an embodiment where the piston 12 and walls of the cylinder 50 are made of a metal(s).

In designing the exhaust valve assembly, the skilled practitioner will appreciate that the relative rate of flow of exhaust gases and contaminants escaping the exhaust valve assembly may be increased or decreased, for example, by using different sizes, dimensions, tolerances, geometries and/or materials for the piston 12, the cylinder 50, the opening 54, which may be disposed on a bottom portion 62 of the valve body 14, the opening(s) 52, which may be disposed, along a top portion of the cylinder 50, defined by the retention plate 11, and other related features. The configuration of the piston 12, may affect the flow rate of the exhaust gases because it is a moving, dynamic part of the valve assembly, where for example, the weight of the piston 12 may be selected based on the process gas pressure so as to facilitate and/or modify levitation within the cylinder 50 and desired venting rate. As a general guideline, the weight of the piston 12 should be less than the maximum upwards force exerted by the escaping gases achieved or expected during the process. This relationship between piston weight and expected gas pressure may be altered to achieve a desired amount or rate of gas outflow through the exhaust valve body. Similarly, the friction between the outer walls 24 of the piston 12 and the inner walls 23 of the valve body 14 may also affect the flow rate. The size of the gap 26 between the outer walls 24 of the piston 12 and the inner walls 23 of the valve body 14 may also influence relative flow rate of exhaust gases. Another variable in the exhaust valve assembly that may influence the flow rate of the exhaust gases is the amount of travel of the piston 12 within the cylinder 50. For example, if the piston 12 is allowed to travel a relatively greater distance, then the gas flow may be relatively greater than if the piston 12 is allowed to travel a relatively shorter distance. The amount of travel may be modulated in designing the assembly by changing the geometry of the piston 12 and/or the cylinder 50. Additional features such as protrusions within the cylinder 50 or protrusions at the top of the piston 12 may also be used to limit the travel of the piston 12.

Figure 6:
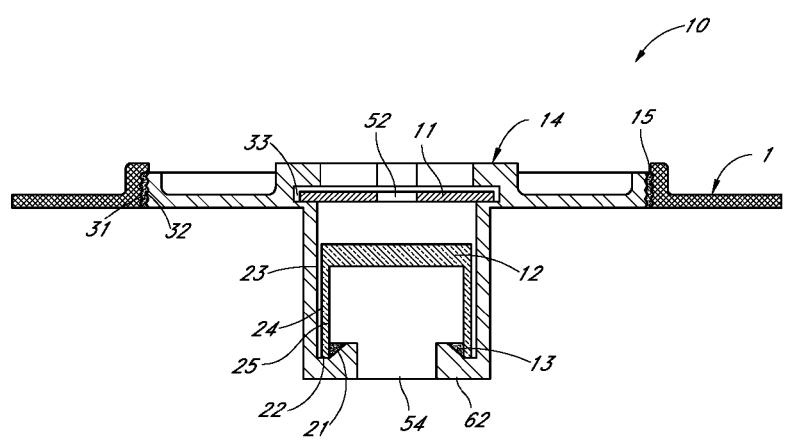
FIG. 6 is a detailed cross-sectional view of another embodiment of an exhaust valve and container, showing a different geometry of the annular lip surrounding the opening at the bottom of the valve body.

FIG. 6 shows another embodiment, where the annular lip 21 at the bottom portion 62 of the valve body 14 may be angled or inclined, such that in the illustrated embodiment, the annular lip 21 slopes downwards in an outwardly radial direction into the trough 22. The angle of the incline and the depth of the trough 22 may vary depending on the requirements. For example, if it is uncertain whether the container will be placed on a level surface, the angle of the incline may be increased to prevent spillage of the piston sealing material 13, once melted, through the opening 54 and into the air-tight container 1. Also, if additional piston sealing material 13 is desired, the depth of the trough 22 (or alternatively, the height of the annular lip 21) and angle of the incline may be increased to hold additional piston sealing material 13. In other embodiments, the angled annular lip configuration may be selected to enhance the sealing efficiency (e.g., the area of contact between the inner wall 25 of the piston 12 and the piston sealing material 13), while minimizing the volume of piston sealing material 13 needed to secure a positive seal.

Figure 7:
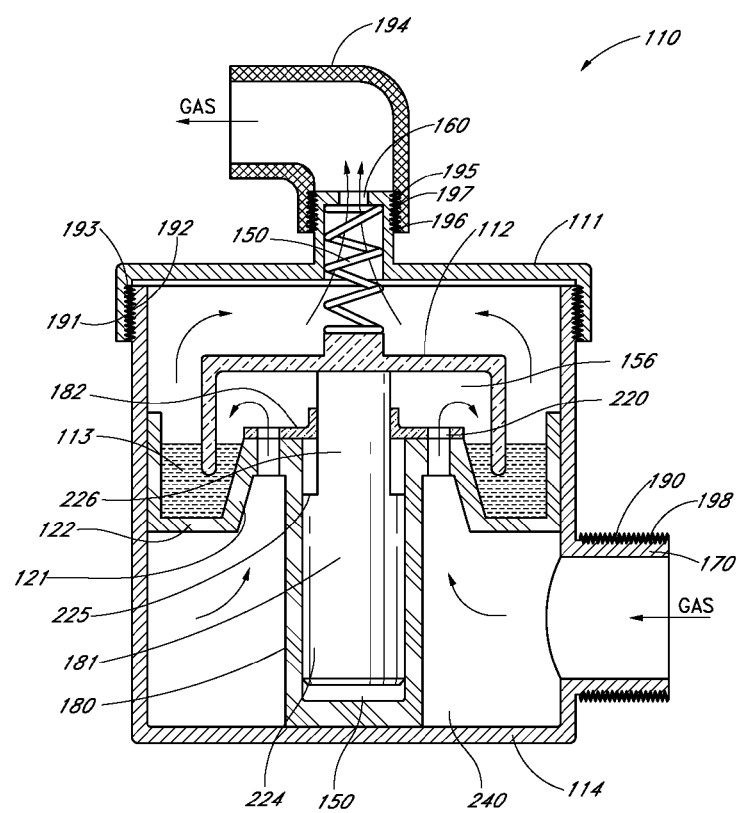
FIG. 7 is a detailed cross-sectional view of another embodiment of an exhaust valve having a tension spring.

FIG. 7 shows a cross-section of another embodiment of an exhaust valve assembly 110, which has some features analogous to those embodiments shown and described above with reference to FIGS. 1-6. In this embodiment, a container (not shown) may be connected to an exhaust valve assembly 110 at an inlet coupling 170. The inlet coupling 170 may have screw threads 190, as illustrated, which would correspond to complimentary or mated screw threads (not shown) associated with an opening in the container. A sealing material 198 may be placed on or around screw threads 190 to provide a secure seal to the container. The exhaust valve assembly 110 may have a valve body 114, and a valve cover 111. The valve cover 111 may fit over the valve body 114, and may have screw threads 191, which would correspond to screw threads 192 on the valve body 114—thereby providing, in some embodiments, a removable and sealable coupling between the valve cover 111 and the valve body 114. A sealing material 193 may be disposed between the threads 191 and 192 to provide a secure seal. A piston 112 may be disposed within the valve body 114 and may be reversibly or irreversibly connected to a guide rod 181, e.g., by a threaded coupling or by welding, etc. In some embodiments, the piston 112 and guide rod 181 may be integrally formed. The guide rod 181 may be disposed as illustrated within a cylinder 150 formed within the valve body 114 and defined by side walls 180. A cover plate 182 positioned near the top of the cylinder 150, may restrict the lateral movement of the guide rod 181 within the cylinder. The guide rod 181 may be shaped to limit the vertical travel of the piston 112 by abutting the cover plate 182 when the guide rod 181 travels upward within the cylinder 150. In the illustrated embodiment, the guide rod 181 has a wider lower portion 224 with a transition, shoulder or step-down 225 to a narrower upper portion 226, which configuration allows a precise amount of travel that would be restricted by contact of the step-down 225 with the cover plate 182.

In some embodiments, the guide rod 181 may also employ different materials or surface finishes which may influence the amount of friction between the guide rod 181 and the cylinder walls 180. Further, a fluid may be placed within the cylinder to act as a damping fluid to slow down the movement of the guide rod 181 and the piston 112. The cover plate 182 may have one or more openings 220 to allow gases to pass between a lower chamber 240 of the exhaust valve body 114 and up into a hollow interior space 156 defined by the piston 112. A trough 122 may be formed within the valve body and may be defined by a vertical annular lip or an inclined (as illustrated) annular lip 121. One or more vent holes 160 may be disposed within the valve cover 111. In some embodiments, as illustrated, the top of the valve cover 111 may be configured to coupler to an exhaust conduit 194 that may act as an exhaust pipe or simply redirects the gas in a different direction. The exhaust conduit 194 may have threads 195, as illustrated, which mate with corresponding threads 196 on the valve cover 111, and a sealing material 197 may be placed between the threads.

In some embodiments, a pressure regulating spring 150 may be placed between the valve cover 111 and the piston 112. The purpose of the spring 150 may be to provide resistance against the upwards movement of the piston 112 and thereby regulate the amount of exhaust gases escaping through the exhaust valve assembly 110. In one embodiment, as illustrated, the valve cover 111, spring 150, piston 112, and guide rod 181 may all be cylindrical. However, any other geometries may be used that are consistent with the functions of the components of the assembly. Further, a variety of different materials may be used for the various components, such as the materials described for the embodiments described in FIGS. 2-6. The spring 150 described in this embodiment may be implemented with other embodiments, such as the ones described in FIGS. 1-6. The third, fourth and fifth sealing materials may be of the same composition as those described for the piston and thread sealing materials described with reference to FIGS. 1-6.

In one embodiment, as illustrated in FIG. 7, a piston sealing material 113 may be placed into the trough 122. The piston sealing material 113 may be selected from any of those previously described with reference to FIGS. 2-6, including water, oil, solutions, solutions containing salts, alcohol or other liquids, metal alloys, glass, and ceramics. If oil or water is used as the piston sealing material 113, the piston 112 may be designed such that it will partially float (e.g., be suspended) within the water or oil. In some embodiments, an oil/water emulsion may be used as the sealing material. The piston 112 may be suspended in or float on the piston sealing material 113 if it is less dense than the liquid sealing material used. If water, oil or other liquids are used, it may be necessary to provide sufficient water, oil or other liquids in the fluid trough because some of the liquid may vaporize during the operational process. Alternatively, the water, oil or other liquids may be replenished by having an inlet pipe (not shown) that adds more liquid into the fluid trough. In the case of water, oil or other liquids, at the end of the process, the water or oil may not solidify because the process may end at room temperature. In contrast, other materials, such as metals, may likely solidify at the end of the process and create a weld-like seal as previously described in the embodiments in FIGS. 2-6. In the case of water, oil or other liquids, the sealing effect may be compromised if there is excessive movement or tilting of the exhaust valve assembly 110.

The embodiment shown in FIG. 7 operates in a similar manner as the embodiments shown in FIGS. 2-6. Gases and contaminants escape as the container having the raw material is heated up. The gases flow into the lower chamber 240 of the exhaust valve body 114, up through opening(s) 230 within the valve body 114 and the cover plate 182, and exert an upward force on the piston 112. Depending on the weight of the piston 112, the nature of the piston sealing material 113, the piston may be at least partially submerged (i.e., partially floating or suspended) within the trough 122, or it may be fully submerged and resting on the floor of the trough 122. When the gas pressure is sufficient to counteract the weight of the piston 112 and the downward force of the pressure regulating spring 150, the piston 112 may rise above the piston sealing material 113, allowing the gases to escape up through the top vent 160 in the valve cover 111, and out the exhaust conduit 194 (if present). At the end of the process when the escaping gases do not exert sufficient upwards force on the piston 112 due to the lack of remaining gases or a decreased temperature, the piston 112 may move downwards (because of a combination of gravity and spring force) and rest in the trough 122 or float or partially float within the piston sealing material 113, thereby creating a seal that preventing further gases from venting. A piston sealing material 113 that transitions from solid to liquid form when heat is applied may also be used, in which case the sealing material will take a liquid form during one point in the process, and then return to a solid form, and may weld the piston 112 to the trough 122 in the valve body 114 at the end of the process when the temperature returns to a lower level. As a general guideline, the sum of the downward force exerted by weight of the piston 112 and the force of the spring 150 should be less than the maximum achieved or expected upwards force exerted by the escaping gases on the piston 112 during the process. This relationship may be altered to achieve a desired amount or rate of gas outflow through the exhaust valve assembly 110.

Selection of Sealing Materials

Selection of the various sealing materials used in the assembly may contribute to the proper performance of the exhaust valve assembly. The piston sealing material (13 in FIGS. 1-6; and 113 in FIG. 7) may be chosen based on a process temperature at a point in the process where a dynamic seal between the trough of the valve body and the piston is desired. For example, if the process is known to start at 25° C., and reaches 400° C. as a maximum, but it is known that after 1 hour at 400° C., no further gases are generated by heating the raw material at any temperature below 200° C.—then the piston sealing material may be selected to be a solid at 25° C., melt to a liquid or semi-liquid at 200° C., and remain in a liquid or semi-liquid state without vaporizing into a gas at 400° C. It may also be relevant to consider the operating pressures of the process, as different pressures may affect the melting and vaporization points of the sealing materials. Further, the selection of the sealing materials for different locations in the assembly (e.g., the piston sealing material employed in the trough (13 and 113) versus the thread sealing materials used on the various threaded couplings 15, 193, 197 and 198) may be based on different operational temperatures. For instance, if it is desired that the thread sealing material melt near the start of the process to strengthen the seal between the container and the exhaust valve assembly, the thread sealing material may be selected to have a melting point slightly above room temperature, while the piston sealing material can be selected based on a process temperature, which may be well above the melting point of the thread sealing material. In another embodiment, the selection of sealing materials and may be selected based on the temperature of the exhaust gas escaping through the exhaust valve assembly. As a general guideline, the piston sealing material and the thread sealing material may be selected based on the following: 0~200° C., water or oil; 200~400° C., metal alloy materials; 600~800° C., metals, 800~1000° C., metal or ceramic materials.

The pre-sintering process for lithium iron phosphate may be carried out at an operational temperature above 400° C. However, the exhaust valve assembly may be used in other processes requiring a one-way seal, and may be used in other sintering operations relating to various raw materials, including lithium iron phosphate. In one embodiment, the selection of piston and thread sealing materials is based on an operational temperature between 200° C. and 400° C. In another embodiment, the selection of piston and thread sealing materials is based on an operational temperature above 400° C. In another embodiment, the selection of piston and thread sealing materials is based on an operational temperature between 200° C. and 500° C. In another embodiment, the selection of piston and thread sealing materials is based on an operational temperature between 300° C. and 400° C. In another embodiment, the selection of piston and thread sealing materials is based on an operational temperature between 300° C. and 500° C. In another embodiment, the selection of piston and thread sealing materials is based on an operational temperature between 500° C. and 800° C. In another embodiment, the selection of piston and thread sealing materials is based on an operational temperature above 800° C.

Methods of Making and Using an Exhaust Valve Assembly

A method of making or assembling an exhaust valve assembly may include for example: providing a valve body 14 having a cylinder 50 with an opening 54 disposed on a bottom portion 62 of the valve body 14 and a trough 22 surrounding the opening 54; applying a piston sealing material 13 within the trough 22, which is formed by an annular lip 21 extending upward from the bottom portion 62 of the valve body 14; inserting a piston 12 into cylinder 50, such that a bottom portion or rim 62 of the piston 12 is seated within the trough 22 and contacting the piston sealing material 13 thereby securing the piston 12 in place within the trough 22. Of course, in some embodiments of the assembly method, the piston is inserted before the sealing material is applied. In other embodiments, the piston and sealing material are positioned together and then inserted into the cylinder. Once the piston is placed within the cylinder, a retention plate 11 may be secured over the top of the cylinder, e.g., by fitting into a slot 33 in the valve body 14. The slot 33 along a top region 7 of the valve body 14, may include a lock-and-key type coupling (as illustrated in FIG. 1), in which the retention plate 11 is placed into the slot 33, by lining up one or more splines 8 on the retention plate 11 with one or more complimentary recesses 9 along the top region 7 of the valve body 14. In some embodiments, the retention plate 11 may be turned after insertion through the coupling, such that the retention plate 11 becomes locked in place within the slot 33 over the top of the cylinder 50. The order in which the steps are performed is not limiting on the assembly method.

For use in pre-sintering or other processes, and with reference to the embodiments illustrated in FIGS. 1-6, a container 1 with an opening 51 is provided. Raw material to be heated, e.g., once the exhaust valve assembly 10 has been assembled as described above, with the bottom rim 62 of the piston 12 seated on the floor of the trough 22 and the inner wall 25 of the piston sealed by the piston sealing material 13 against the annular lip 21 of the trough 22, and the retention plate 11 secured within the slot 33 on the top region 7 of the valve body 14, the exhaust valve assembly 10 may be removably attached to an opening 51 in a container 1, such that the opening 54 in the cylinder is at least partially aligned with the opening 51 in the container—thereby allowing direct exchange of exhaust gases, between the interior of the container and an interior space defined by the piston 12. In some embodiments, the exhaust valve assembly 10 is removably attached to the opening 51 in the container 1 by screwing the two components together—e.g., a threaded outer surface 32 of the valve body 14 may be screwed into an inner surface 31 of an annular lip 38 of the container 1. In some embodiments of the assembly method, a thread sealing material 15 is disposed between the threaded surfaces 31 and 32, thereby providing a seal that is at least substantially gas-tight between the valve body and the container.

A method of using the exhaust valve assembly 10 may include, for example, placing a raw material in the container 1, applying a thread sealing material 15 between a fully assembled exhaust valve assembly 10 and the opening of the container 1, removably screwing the exhaust valve assembly 10 into the opening 51 in the container 1, such that the thread sealing material 15 is compressed between threads 31 and 32, heating the container 1 and the raw material therein, e.g., by placing the container into a furnace, such that exhaust gases generated by heating the raw material pass through the hole 51 and exert force on the piston 12. The process conditions (temperature and pressure) in some embodiments cause the piston sealing material 13 to transition from the solid state to liquid state, melting the thread sealing material 15, creating an substantially air-tight seal between the exhaust valve assembly 10 and the opening of the container 1, reducing the heat provided to the raw material, resulting in a cessation of exhaust gas passing through the hole 51, causing the piston 12 to rest within the annular trough 22 in the bottom portion of the valve body 14 due to gravity, wherein the reduction of heat causes the piston sealing material 13 to transition from the liquid state back to the solid state, and creating a substantially air-tight seal with the solidified piston sealing material 13 between the piston 12, the inner wall 23 of the cylinder 50, and the annular lip 21 of the valve body 14.

In another method, a piston sealing material 13 and thread sealing material 15 may be selected based on at least one operational temperature that is above the melting point of the piston sealing material 13 and thread sealing material 15. In another method, a piston sealing material 13 may be formed into a shaped wire band or ring. In another method, a piston sealing material 13 may be placed into a bottom trough 22 of a valve body 14, a piston 12 may be inserted into the cylinder 50, and a retention plate 11 may be positioned in the valve body above the piston 12, thereby retaining the piston 12 within the cylinder 50.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds or compositions, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method, comprising:
   placing a raw material in a container comprising an opening;
   removably coupling the opening in the container with an exhaust valve assembly comprising:
   a valve body comprising a cylinder and a trough disposed within the cylinder along a bottom portion of the valve body;
   a piston slideably engaged within the cylinder, wherein at least a portion of the piston is configured to reside within the trough when the piston is in a resting position; and
   a piston sealing material disposed within the trough, wherein the piston sealing material has a melting point below a first operational temperature;
   heating the container holding the raw material to generate an exhaust gas, wherein the exhaust gas passes through the opening, elevates the piston, and melts the piston sealing material; and
   allowing the container to cool to cease generation of exhaust gas, wherein a decrease in exhaust gas pressure allows the piston to return to the resting position, and wherein the piston sealing material solidifies as the container cools, thereby creating an air-tight seal.

2. The method of claim 1, further comprising removing the exhaust valve assembly from the opening of the container.

3. The method of claim 1, wherein the raw material is lithium iron phosphate.

4. The method of claim 3, wherein the first operational temperature is based on an exhaust gas temperature for a lithium iron phosphate pre-sintering process.

5. The method of claim 1, wherein the first operational temperature is between 200° C. and 400° C.

6. The method of claim 1, wherein the first operational temperature is between 200° C. and 500° C.

7. The method of claim 1, wherein the first operational temperature is between 300° C. and 400° C.

8. The method of claim 1, wherein the first operational temperature is between 300° C. and 500° C.

9. The method of claim 1, wherein the exhaust valve assembly is removably coupled to the opening of the container by screwing a threaded surface on an outer periphery of the valve body into a receptive threaded surface disposed along an inner periphery of the opening of the container, and wherein a thread sealing material is compressed between the threaded surfaces of the valve body and the opening of the container.

10. The method of claim 9, wherein the thread sealing material comprises a powdery mixed metallic material.

11. The method of claim 10, further comprising forming the thread sealing material into a shaped wire band.

12. The method of claim 1, further comprising positioning a retention plate within the valve body above the piston.

13. The method of claim 1, wherein the piston comprises a high temperature resistant ceramic material.

14. The method of claim 1, wherein the valve body further comprises a spring configured to exert a downward force on the piston.

* * * * *

UNITED STATES PATENT AND TRADEMARK OFFICE
CERTIFICATE OF CORRECTION

| | | |
|---|---|---|
| PATENT NO. | : 9,546,010 B2 | Page 1 of 1 |
| APPLICATION NO. | : 13/978700 | |
| DATED | : January 17, 2017 | |
| INVENTOR(S) | : Huo | |

It is certified that error appears in the above-identified patent and that said Letters Patent is hereby corrected as shown below:

In the Specification

In Column 1, Line 7, delete "§371 of PCT/CN2011/081406, filed Oct. 27, 2011," and insert -- § 371 of PCT/CN2011/081406, filed on Oct. 27, 2011, --, therefor.

In Column 1, Line 9, delete "herein" and insert -- herein. --, therefor.

In Column 1, Lines 44-45, delete "spray produced" and insert -- spray-produced --, therefor.

Signed and Sealed this
Fourth Day of April, 2017

Michelle K. Lee
*Director of the United States Patent and Trademark Office*